(12) United States Patent
Huang

(10) Patent No.: US 6,281,674 B1
(45) Date of Patent: Aug. 28, 2001

(54) WIRELESS BICYCLE TRIP METER

(76) Inventor: Chun-Mu Huang, 6 Fl., No. 60-5, Jengyi S. Rd., Sanchung city, Taipei (TW)

( * ) Notice: Subject to any disclaimer, the term of this patent is extended or adjusted under 35 U.S.C. 154(b) by 0 days.

(21) Appl. No.: 09/352,462

(22) Filed: Jul. 13, 1999

(30) Foreign Application Priority Data

Apr. 6, 1999 (TW) ................................................ 88205245

(51) Int. Cl.[7] .............................. G01P 3/54; G01P 3/481
(52) U.S. Cl. ............................................ 324/174; 340/432
(58) Field of Search ..................................... 324/174, 173, 324/166, 167, 160, 207.26, 260, 205, 172, 394; 340/432, 670, 671

(56) References Cited

U.S. PATENT DOCUMENTS 5,177,432 * 1/1993 Waterhouse et al. ................ 324/166

FOREIGN PATENT DOCUMENTS

0431243 * 12/1991 (EP) .

* cited by examiner

*Primary Examiner*—Jay Patidar
*Assistant Examiner*—Reena Aurora
(74) *Attorney, Agent, or Firm*—Laff, Whitesel & Saret, Ltd.; J. Warren Whitesel

(57) ABSTRACT

A trip meter includes a bracket secured to a member of a bicycle, a main body detachably secured to the bracket, a signal receiving circuit positioned in the main body for wirelessly receiving a pulse signal outputted from a transmitter, and a signal processing circuit electrically connected to the signal receiving circuit for counting a number and a frequency of the pulse signal and correspondingly generating an output signal indicative of the plurality of trip data. The trip meter further includes a display circuit electrically connected to the signal processing circuit for displaying the output signal generated from the signal processing circuit, a battery built in the main body for supplying a power to the signal receiving circuit, the signal processing circuit, and the display circuit, and a detector positioned in the main body for detecting a connective state of the main body and the bracket so that the signal receiving circuit is unable to wirelessly receive the pulse signal of the transmitter when the main body of the trip meter is detached from the bracket on the bicycle.

22 Claims, 11 Drawing Sheets

WIRELESS BICYCLE TRIP METER

FIELD OF THE INVENTION

The present invention relates to a trip meter adapted to be used in a bicycle for displaying a plurality of trip data of the bicycle.

BACKGROUND OF THE INVENTION

The environmental protection and the quality of the leisure time are much respected in the modern world. Therefore, the bicycle becomes a popular vehicle or sports instrument again. A trip meter for providing a plurality of trip data, i.e. the speed and the traveling distance of the bicycle, is mounted on the bicycle widely. Please refer to FIG. 1 which is a diagram showing the assembly of the trip meter secured to the bicycle. A magnetic bar 11 is positioned on one of these spokes 12 and a signal transmitter 13 is secured to the forks 14 of the bicycle. A reed switch is positioned in the signal transmitter 13. Each time the bicycle travels over a specific distance, the reed switch will generate a pulse signal due to the magnetic force of the magnetic bar 11 after the magnetic bar 11 passes through the signal transmitter 13. The pulse signal can be wirelessly received by the trip meter 15 mounted on the handle of the bicycle. According to the frequency of the pulse signals and the diameter of the wheel, a plurality of trip data can be calculated, such as the speed, the time, and the traveling distance of the bicycle.

Please refer to FIG. 2 which is a diagram showing the structure of the trip meter. The trip meter includes a bracket 21 mounted on the handle of the bicycle and a main body 22 secured to the bracket 21. In order to use the trip meter more easily, the main body 22 is detachably secured to the bracket 21.

Please refer to FIG. 3(a) which is a block diagram showing the detail structure of the trip meter 15. The trip meter 15 includes a signal receiving circuit 151, a signal processing circuit 152, a liquid-crystal display (LCD) 153, and a battery 154. The battery 154 supplies the power to the signal receiving circuit 151 through the signal processing circuit 152. After supplying the power, the signal receiving circuit 151 can receive the pulse signal outputted from the signal transmitter and the signal processing circuit 152 electrically connected to the signal receiving circuit 151 can count a number and a frequency of the pulse signal and correspondingly generate an output signal indicative of a plurality of trip data. The LCD display 153 can display these trip data such as the speed, the time, and the traveling distance of the bicycle.

According to FIG. 3(a), these elements are positioned in the main body 22 of the trip meter. When the user stops riding the bicycle, the main body 22 can be detached from the bracket 21. The user can record the trip data shown on the main body 22 and store the main body 22 of the trip meter. In order to store all trip data, all elements must keep in action even though the main body 22 is disconnected from the bracket 21. When the main body 22 is positioned near an electronic device which outputs a wireless electromagnetic signal, the signal receiving circuit 151 may be interfered by this signal and the pulse signal may not be received by the signal processing circuit 152, thereby causing an error in calculating the trip data.

In order to avoid the error caused by other wireless signal, a timing function of the signal processing circuit 152 is added. When the signal processing circuit 152 does not receive any pulse signal, the timer starts. When the time interval is longer than a predetermined time interval, i.e. 10 minutes or 1 hour, the signal processing circuit 152 stops supplying the power to the signal receiving circuit 151 even though the main body 22 is secured to the bracket 21 of the bicycle. Until the user restarts to ride the bicycle, the signal processing circuit 152 supplies the power to the signal receiving circuit 151 again. No error occurs because the signal receiving circuit 151 can not be operated without power. However, the user may take a break during the trip and stop riding the bicycle. When the rest time of the user is longer than the predetermined time interval, the power supplied to the signal receiving circuit 151 through the signal processing circuit 152 is interrupted. The pulse signal of the signal transmitter can not be received by the signal receiving circuit 151 without power, so the trip date can not be recorded and shown on the display. On the other hand, when the rest time is shorter than the predetermined time interval, the signal receiving circuit 152 is still at work. Any wireless signal may interfere the operation of the signal receiving circuit 151 at this time. The signal processing circuit 152 may take the interfering signal as a normal signal and keep supplying the power to the signal receiving circuit 151 when the user takes a rest. Therefore, the wrong operation of the signal processing circuit 152 is avoidless by timing the time interval while the signal receiving circuit 151 does not receive the pulse signal of the signal transmitter.

In order to solve the above problem, the signal receiving circuit 151 is moved to be positioned in the bracket 21. Referring to FIGS. 3(b) and 3(c), there are two methods for designing the structure of the trip meter. In FIG. 3(b), the signal receiving circuit 151 is positioned in the bracket 21. The bracket 21 further includes a battery 155 for supplying the power to the signal receiving circuit 151 and two contacting points 1563, 1564 respectively connected with the contacting points 1561, 1562 on the main body 22. When the main body 22 is detached from the bracket 21, the signal processing circuit 152 is disconnected from the signal receiving circuit 151 and the signal processing circuit 152 may not be initiated by other wireless signal received by the signal receiving circuit 151. However, water cause a damage of these contacting points of the main body 22 so that the bracket 21 and the contacting point must be made of a water-resistant material. Compared to FIG. 3(a), the trip meter in FIG. 3(b) further includes a battery 155 and 4 contacting points 1561~1564. The process of manufacturing the water-resistant contacting point is complicated and the cost of the trip meter will be increased.

In FIG. 3(c), the signal receiving circuit 151 is also positioned in the bracket 21. Two contacting points 1565, 1566 are further added to connect the signal receiving circuit 151 and the signal processing circuit 152. There is no additional battery in the bracket 21 for supplying the power to the signal receiving circuit 151. The power of the signal receiving circuit 151 is also supplied by the battery 154. Although the time and the cost for manufacturing the additional battery can be reduced, the process for manufacturing 6 water-resistant contacting points between the main body 22 and the bracket 21 is still very complicated.

In order to remove all the interfering signals, the applicant attempts to design a filter to be positioned in the signal receiving circuit 151. However, these methods for removing signals are varied along with different signals and there are too many types of electromagnetic signals used in the electronic devices. A filter can just remove several types of noise signals and the signal receiving circuit is still interfered by many noise signals. If a circuit is designed to remove most noise signals, the layout of the circuit will be very complicated, resulting in that the manufacturing process and the cost of the trip meter will be increased. Therefore, it is tried by the applicant to deal with the problem encountered with the prior art.

SUMMARY OF THE INVENTION

A major object of the present invention is to provide a trip meter detachably secured to a bicycle for wirelessly receiving a pulse signal and calculating a plurality of trip data of the bicycle according to the pulse signal.

According to the present invention, the bicycle has a signal transmitter for outputting the pulse signal each time the bicycle travels over a specific distance.

The trip meter of the present invention includes a bracket secured to a member of the bicycle, a main body detachably secured to the bracket, a signal receiving circuit positioned in the main body for wirelessly receiving the pulse signal outputted from the transmitter, a signal processing circuit electrically connected to the signal receiving circuit for counting a number and a frequency of the pulse signal and correspondingly generating an output signal indicative of the plurality of trip data, a display circuit electrically connected to the signal processing circuit for displaying the output signal generated from the processing circuit, and a battery built in the main body for supplying a power to the signal receiving circuit, the signal processing circuit, and the display circuit.

In accordance with one aspect of the present invention, the trip meter further includes a detector positioned in the main body for detecting a connective state of the main body and the bracket so that the signal receiving circuit is unable to wirelessly receive the pulse signal of the transmitter when the main body of the trip meter is detached from the bracket on the bicycle.

Preferably, the detector includes a switching circuit for controlling a power supply of the battery.

Preferably, the switching circuit is a switch having a resilient member for being turned on/off due to an elastic force of the resilient member in response to the connective state of the main body and the bracket.

Preferably, the switching circuit includes a magnetic bar arranged in the bracket and a reed switch arranged in the main body for being turned on/off due to a magnetic force of the magnetic bar in response to the connective state of the main body and the bracket.

Preferably, the switching circuit is mounted between the battery and the signal receiving circuit. The switching circuit is turned on and the power of the battery is supplied to the signal receiving circuit for allowing the signal receiving circuit to wirelessly receive the pulse signal transmitted from the transmitter when the main body of the trip meter is secured to the bracket on the bicycle. In addition, the switching circuit is turned off and the power supplied from the battery to the signal receiving circuit is interrupted so that the signal receiving circuit is unable to receive the pulse signal of the transmitter when the main body of the trip meter is detached from the bracket on the bicycle.

Preferably, the switching circuit is mounted between the battery and the signal processing circuit. The switching circuit is turned on and the power of the battery is supplied to the signal receiving circuit through the signal processing circuit for allowing the signal receiving circuit to wirelessly receive the pulse signal transmitted from the transmitter when the main body of the trip meter is secured to the bracket on the bicycle. In addition, the switching circuit is turned off and the power supplied by the battery is interrupted so that the signal receiving circuit is unable to wirelessly receive the pulse signal of the transmitter when the main body of the trip meter is detached from the bracket on the bicycle.

Preferably, the signal receiving circuit and the signal processing circuit are incorporated into an integrated circuit. The trip data comprise a speed and a traveling distance of the bicycle.

Preferably, the display circuit includes a liquid-crystal display (LCD).

In another preferred embodiment of the present invention, the trip meter includes a bracket secured to a member of the bicycle, a main body detachably secured to the bracket, a signal receiving circuit positioned in the main body for wirelessly receiving the pulse signal outputted from the transmitter, a signal processing circuit electrically connected to the signal receiving circuit for counting a number and a frequency of the pulse signal and correspondingly generating an output signal indicative of the plurality of trip data, a display circuit electrically connected to the signal processing circuit for displaying the output signal generated from the signal processing circuit, a battery built in the main body for supplying a power to the signal receiving circuit, the signal processing circuit, and the display circuit, and a detector positioned in the main body for detecting a connective state of the main body and the bracket so that the signal processing circuit is unable to receive the pulse signal from the signal receiving circuit when the main body of the trip meter is detached from the bracket on said bicycle.

Preferably, the detector includes a switching circuit mounted between the battery and the signal processing circuit for causing the power of the battery to be supplied to the signal processing circuit.

The present invention may best be understood through the following description with reference to the accompanying drawings, in which:

DETAILED DESCRIPTION OF THE PREFERRED EMBODIMENTS

Figure 1:
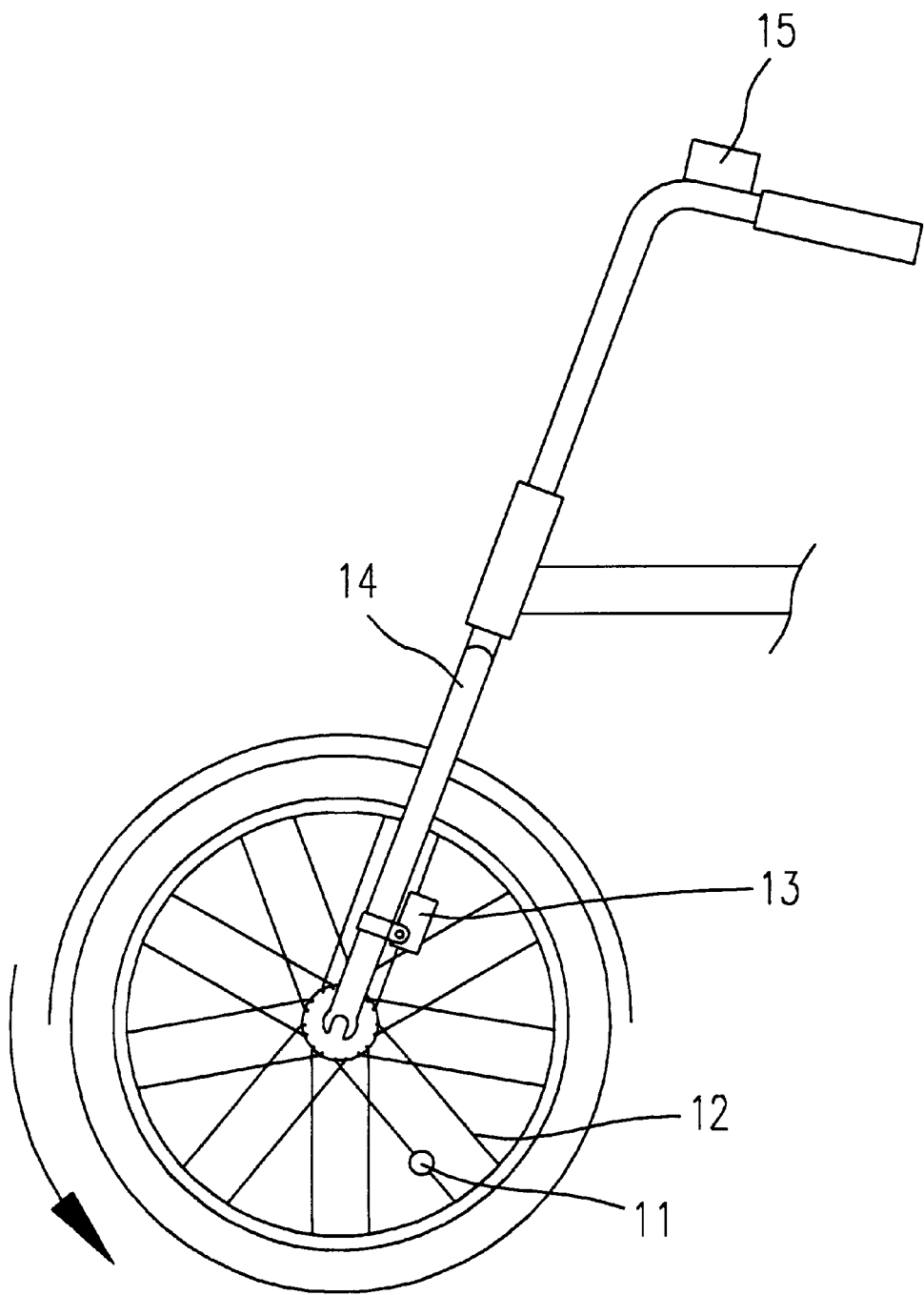
FIG. 1 is a schematic diagram showing the placement of the trip meter of the prior art.
Figure 2:
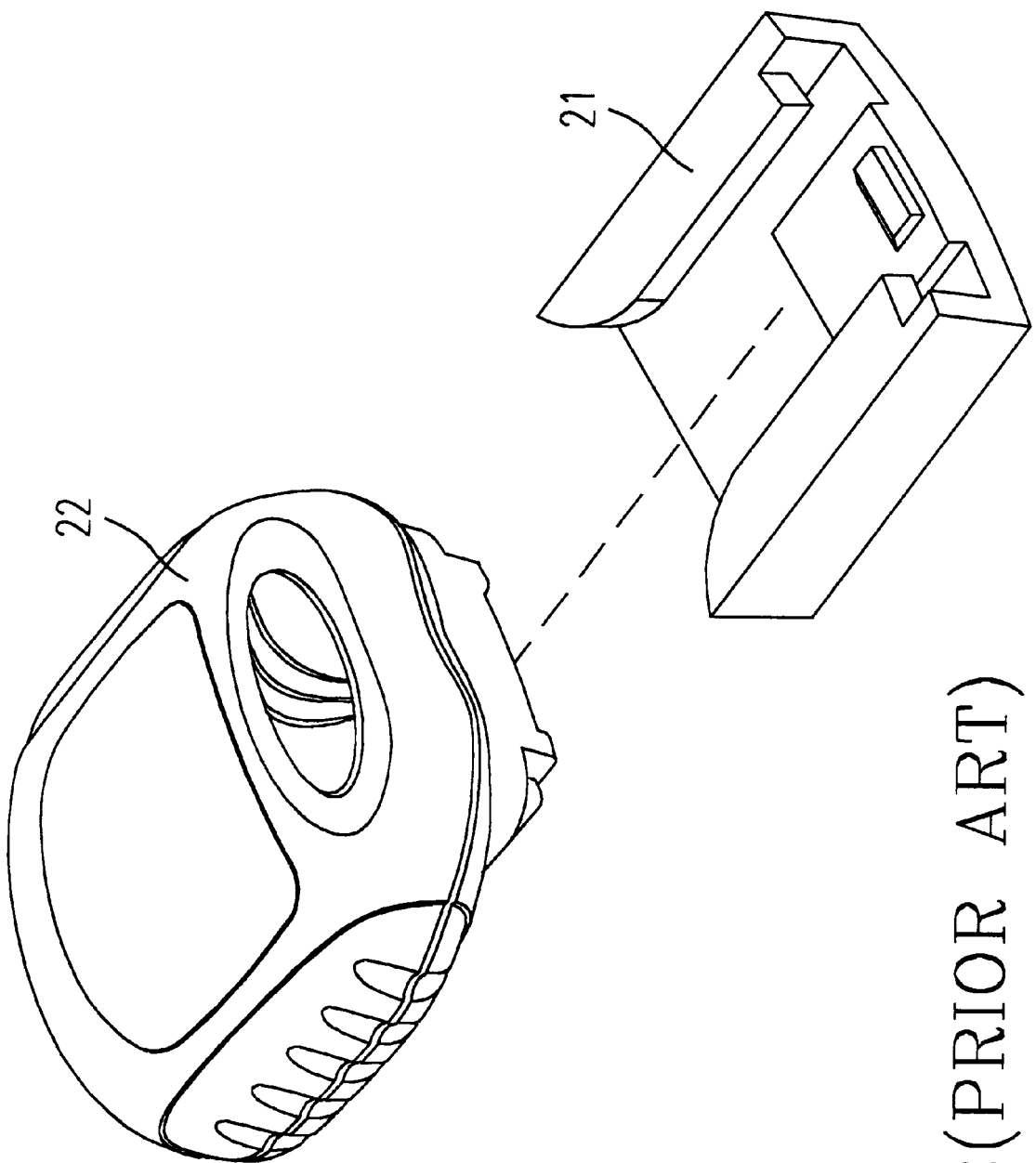
FIG. 2 is a schematic diagram showing the structure of the first kind of trip meter of the prior art.
Figure 3A:
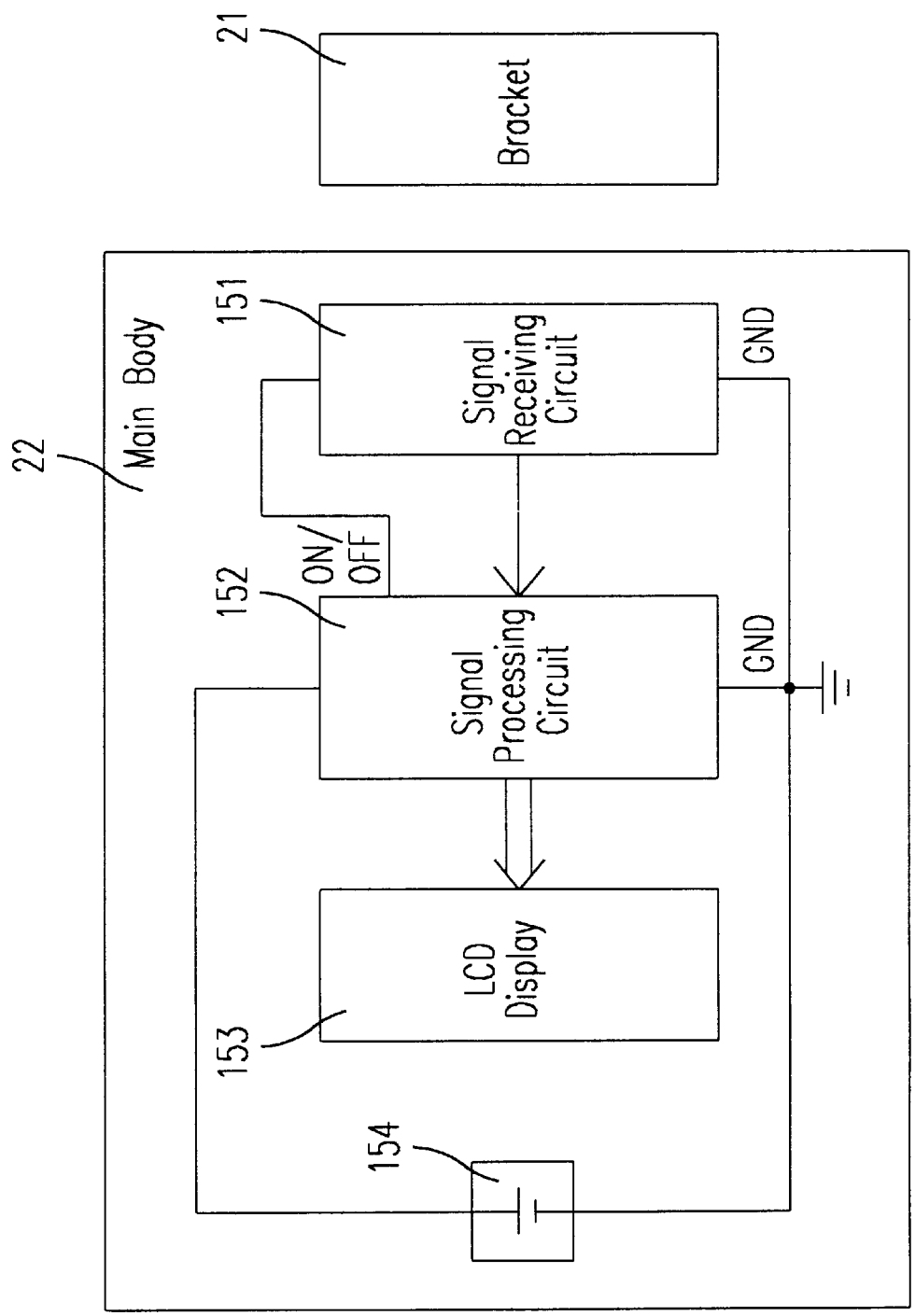
FIGS. 3 (a)~(c) are schematic diagrams showing the structures of the other kinds of trip meter of the prior art.
Figure 3B:
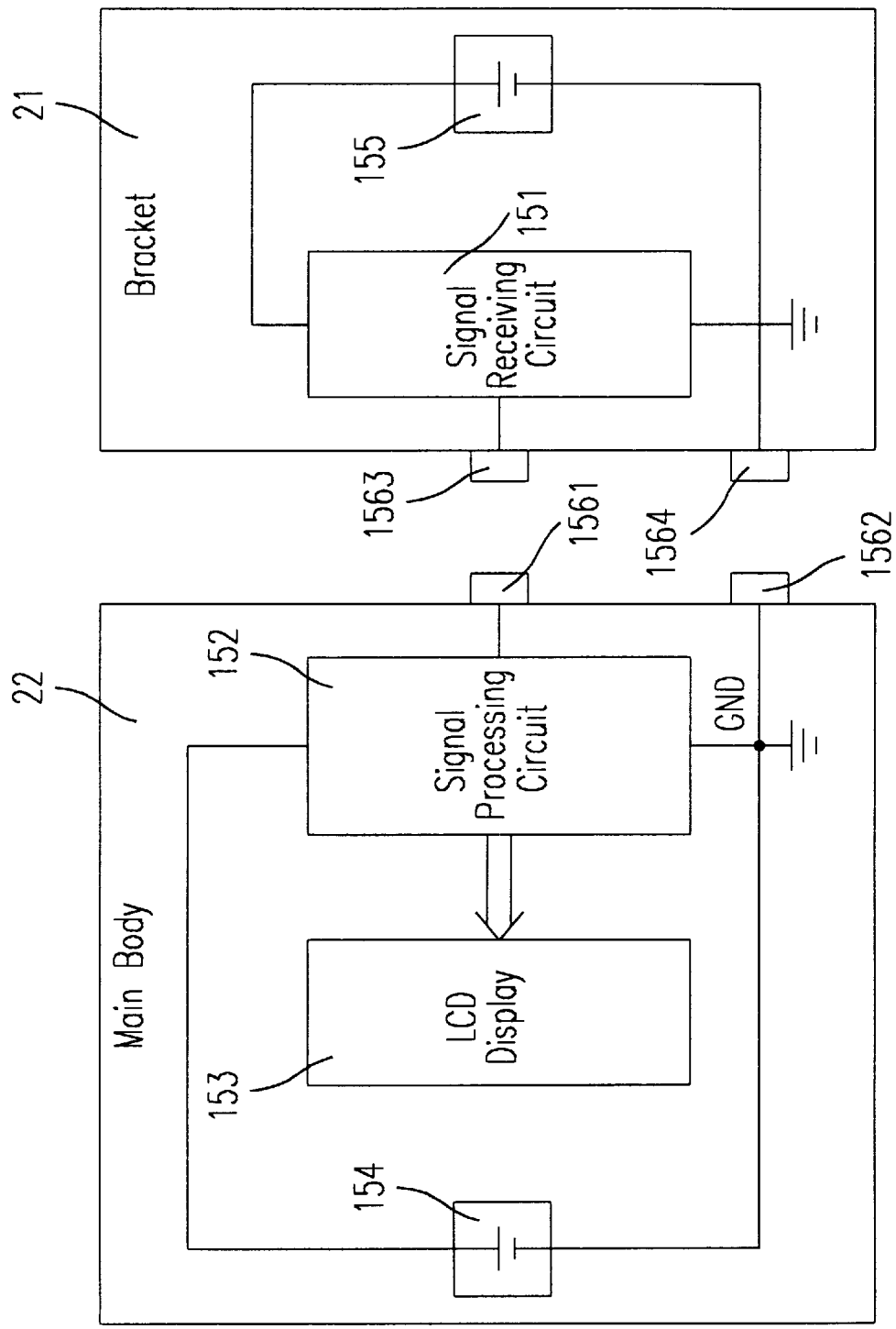
Figure 3C:
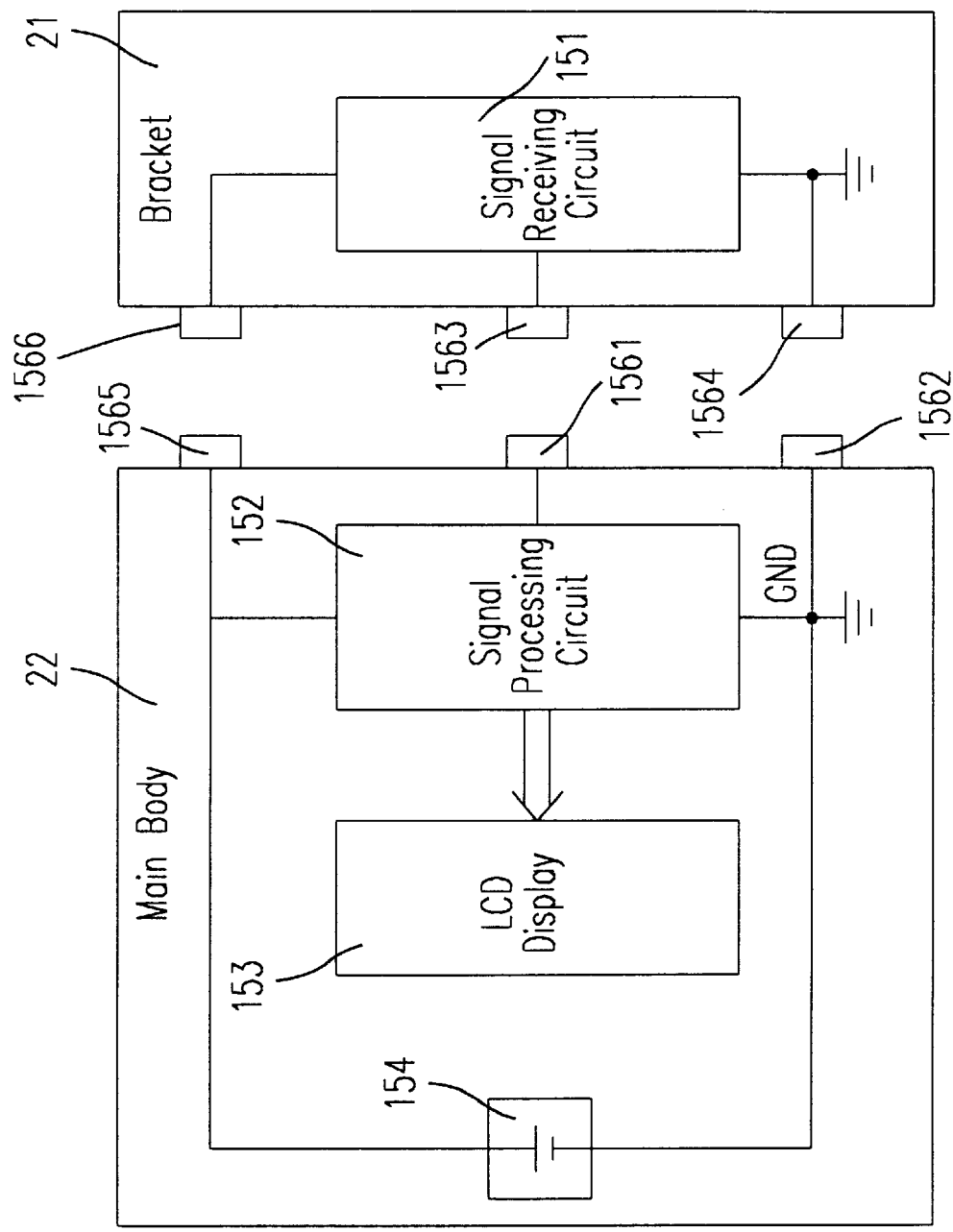

The present invention will now be described more specifically with reference to the following embodiments. It is to be noted that the following descriptions of the preferred embodiments of this invention are presented herein for the purpose of illustration and description only; it is not intended to be exhaustive or to be limited to the precise form disclosed.

Please refer to FIGS. 4(a)~(d) which show the preferred embodiments of the trip meter adapted to be used in a bicycle according to the present invention. The bicycle has a signal transmitter 45 for outputting a pulse signal each time the bicycle travels over a specific distance. The trip meter includes a bracket 47 secured to a handle of the bicycle and a main body 40 detachably secured to the bracket. The main body 40 of the trip meter includes a signal receiving circuit 41, a signal processing circuit 42, a display circuit 43, a battery 44, and a detector 46. The battery can supply power to these devices. The signal receiving circuit 41 can wirelessly receive the pulse signal outputted from the transmitter 45. The signal processing circuit 42 is a microprocessor electrically connected to the signal receiving circuit 41. The functions of the microprocessor include (1) counting a number and a frequency of the pulse signal and correspondingly generating an output signal indicative of a plurality of trip data, and (2) disabling/enabling the power supplied to the signal receiving circuit in response to the signal of the detector 46. The display circuit further includes a liquid-crystal display (LCD) for displaying the trip data indicated by the output signal of the signal processing circuit.

The detector positioned in the main body further includes a switching circuit. The major characteristic of the present invention is that the detector detects a connective state of the main body and the bracket and then controls a power supply of the battery.

Figure 4A:
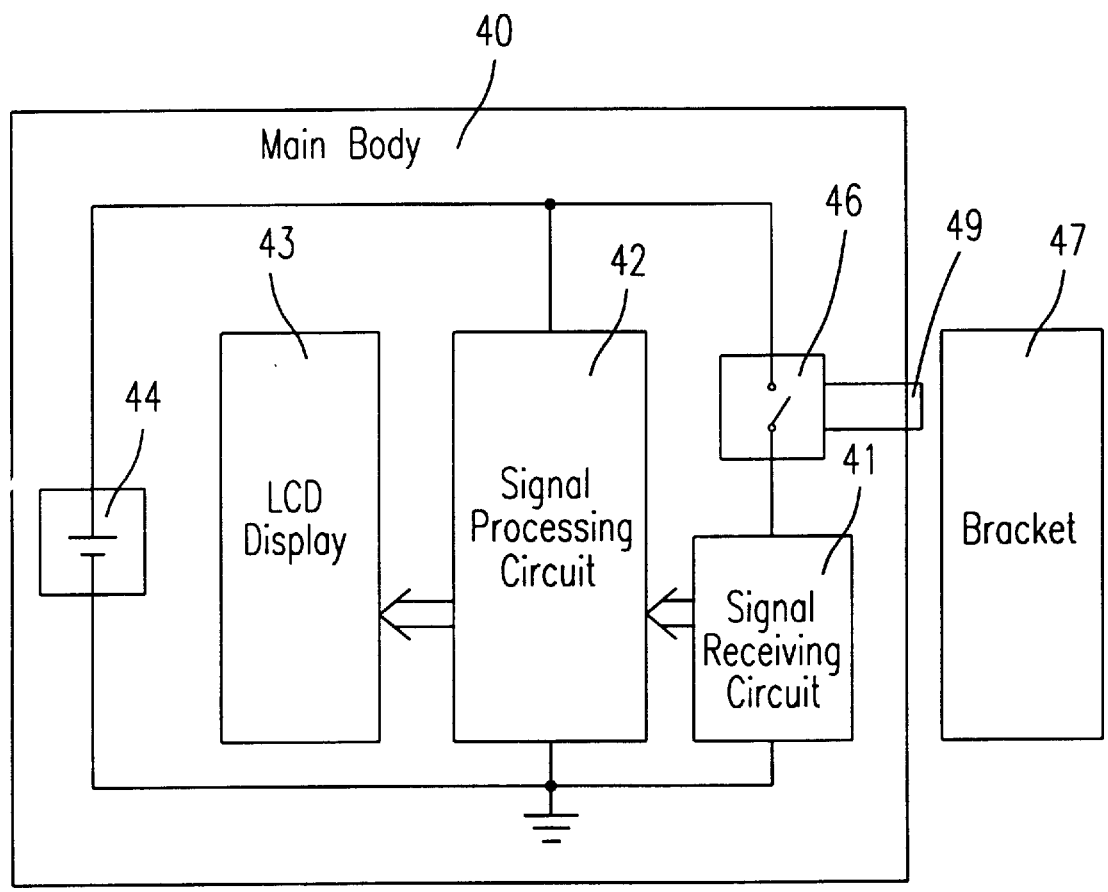
FIGS. 4(a)~(d) are schematic diagrams showing the preferred embodiment of the trip meter of the present invention.
Figure 4A:
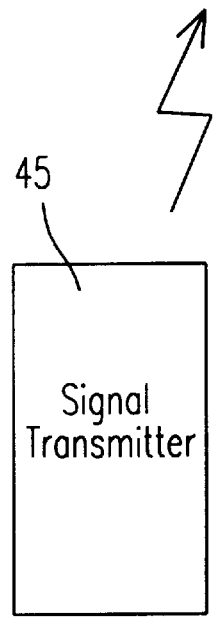

Referring to FIG. 4(a), the switching circuit is a switch having a resilient member for being turned on/off due to an elastic force of the resilient member in response to the connective state of the main body 40 and the bracket 47. The switch 46 is mounted between the battery 44 and the signal receiving circuit 41. When the main body 40 is secured to the bracket 47, the resilient member 49 is pressed into the main body 40 and the switch 46 is turned on. The battery 44 can supply the power to the signal receiving circuit 41, so the signal receiving circuit 41 can wirelessly receive the pulse signal of the transmitter 45 and the signal processing circuit 42 can generate an output signal indicative of the trip data. Therefore, the trip data can be shown on the LCD display. On the contrary, when the main body 40 is detached from the bracket 47, the resilient member 49 is protruded from the main body 40, and the switch 46 is turned off. Therefore, the power supplied from the battery 44 to the signal receiving circuit 41 is interrupted so that the signal receiving circuit 41 is unable to receive the pulse signal of the transmitter 45. The error caused by other signals can be eliminated when the main body 40 of the trip meter is detached from the bracket 47.

Figure 4B:
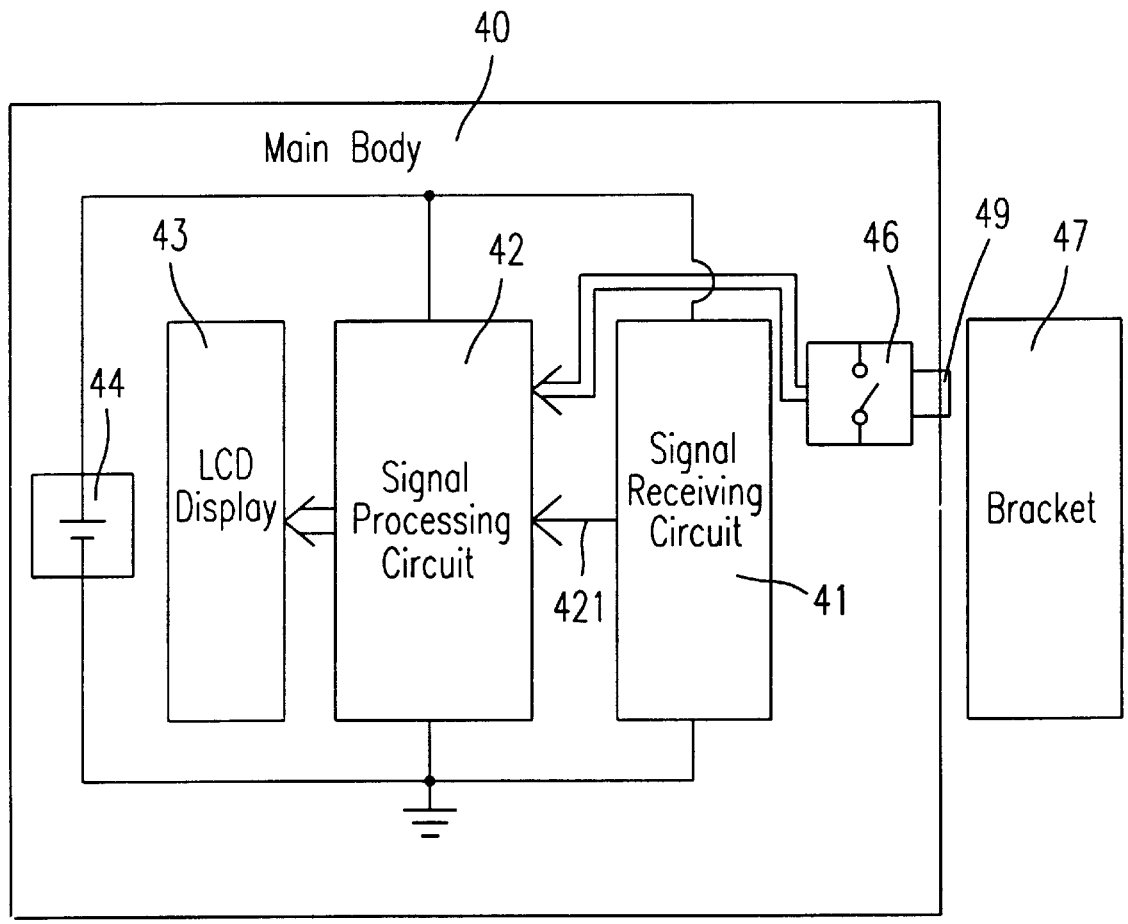
Figure 4B:
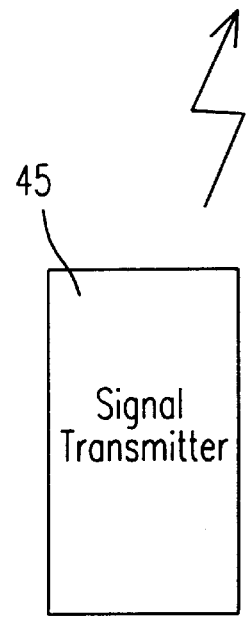

Please refer to FIG. 4(b) which shows a second embodiment of the present invention. The switch 46 is connected to the signal processing circuit 42. The battery 44 supplies the power to the signal receiving circuit 41 and the signal processing circuit 42. When the main body 40 is secured to the bracket 47, the resilient member 49 is pressed into the main body 40 and the switch 46 is turned on. Therefore, the signal receiving circuit 41 can wirelessly receive the pulse signal of the signal transmitter 45 and the signal processing circuit 42 can receive the pulse signal from the signal receiving circuit 41 and generate an output signal indicative of the trip data. The trip data can be shown on the LCD display. On the contrary, when the main body 40 is detached from the bracket 47, the resilient member 49 is protruded from the main body 40 and the switch 46 is turned off. At the same time, the function of the connector 421 between the signal processing circuit 42 and the signal receiving circuit 41 is disabled. Therefore, the signal processing circuit 42 is unable to receive the pulse signal from the signal receiving circuit 41 and thus the error caused by other signals can be eliminated.

Figure 4C:
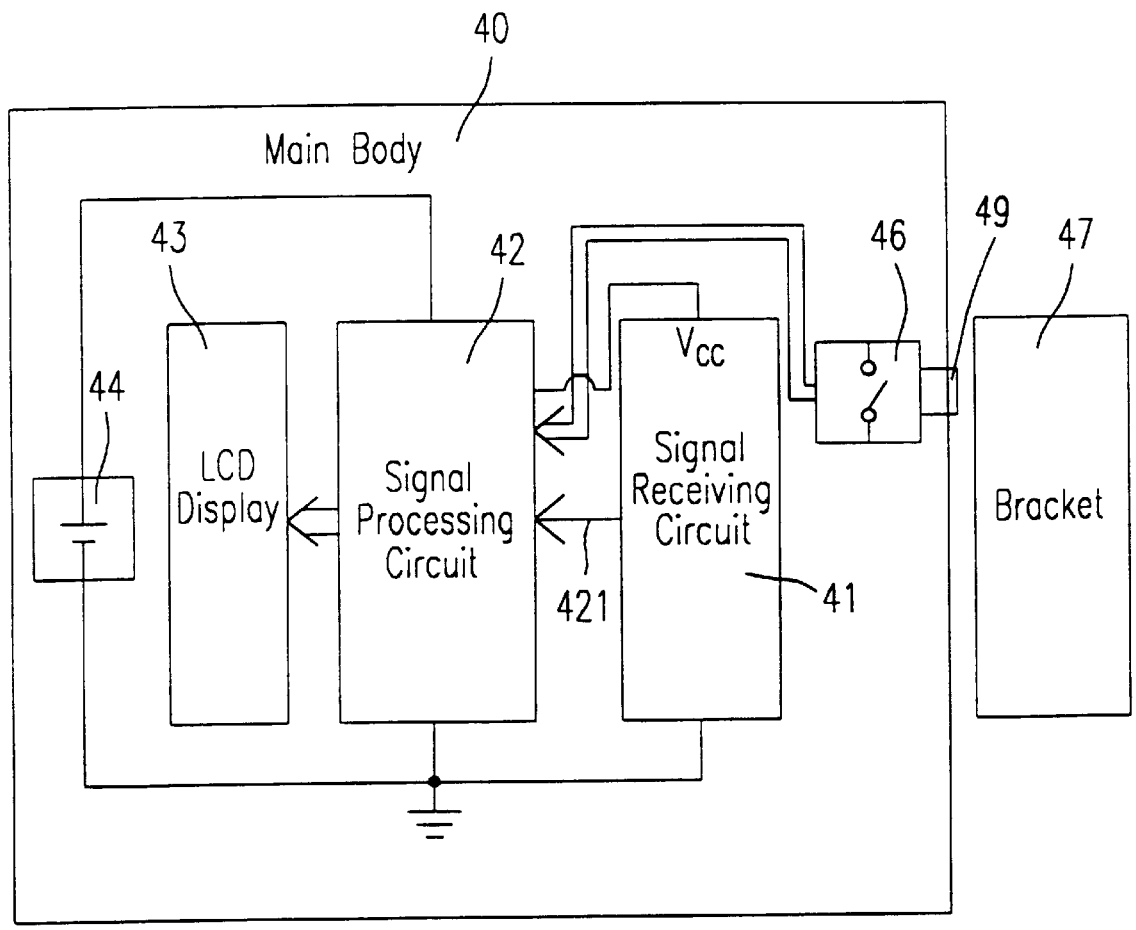
Figure 4C:
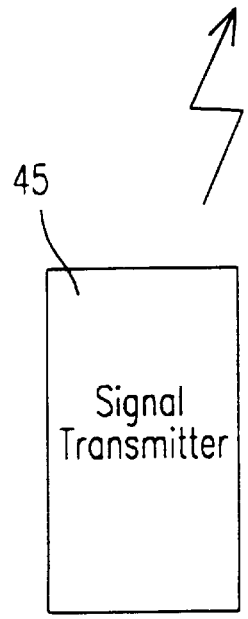

Referring to FIG. 4(c), the switch 46 is mounted between the signal receiving circuit 41 and the signal processing circuit 42. When the main body 40 is secured to the bracket 47, the resilient member 49 is pressed into the main body 40 and the switch 46 is turned on. Therefore, the power of the battery 44 can be supplied to the signal receiving circuit 41 through the signal processing circuit 42, the signal receiving circuit 41 can wirelessly receive the pulse signal of the signal transmitter 45, and the signal processing circuit 42 can generate an output signal indicative of the trip data. The trip data can be shown on the LCD display. On the contrary, when the main body 40 is detached from the bracket 47, the resilient member 49 is protruded from the main body 40 and the switch 46 is turned off. At the same time, the function of the connector $V_{cc}$ of the signal processing signal 42 is disabled. Therefore, the signal receiving circuit 41 is unable to receive the power signal from the signal processing circuit 42 and the signal processing circuit 42 can not receive the pulse signal from the signal receiving circuit 41. The error caused by other signals can be eliminated in the signal processing circuit 42.

Figure 4D:
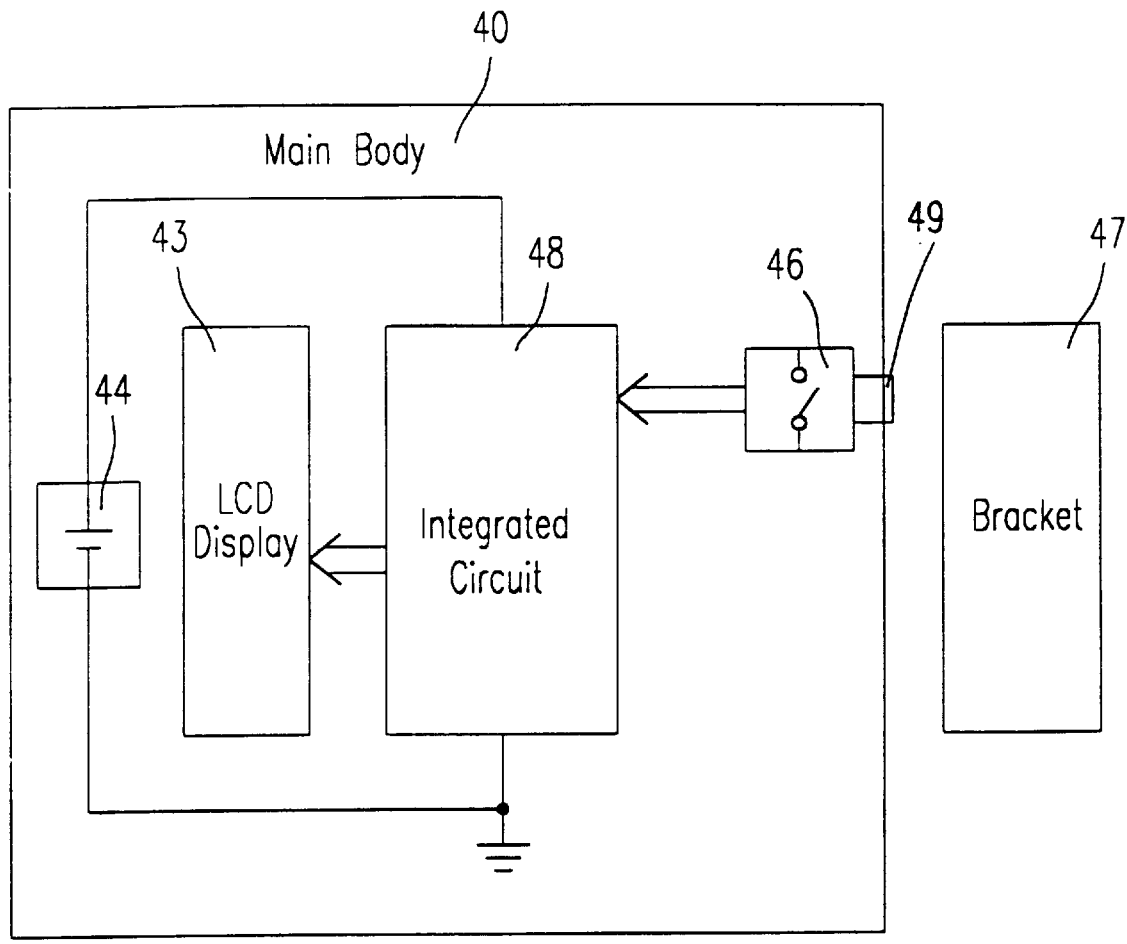

Please refer to FIG. 4(d) which shows a fourth embodiment of the present invention. The signal receiving circuit and the signal processing circuit are incorporated into an integrated circuit 48. The switch 46 is connected to the integrated circuit 48. When the main body 40 is secured to the bracket 47, the switch 46 is turned on. The integrated circuit 48 can wirelessly receive the pulse signal of the signal transmitter 45 and generate an output signal indicative of the trip data. The trip data can be shown on the LCD display. When the main body 40 is detached from the bracket 47, the switch 46 is turned off. At the same time, the loop between the signal processing circuit and the signal receiving circuit is disconnected in the integrated circuit 48. Therefore, the pulse signal can not be received by the integrated circuit 48 so that the error caused by other signals can be eliminated.

Figure 5:
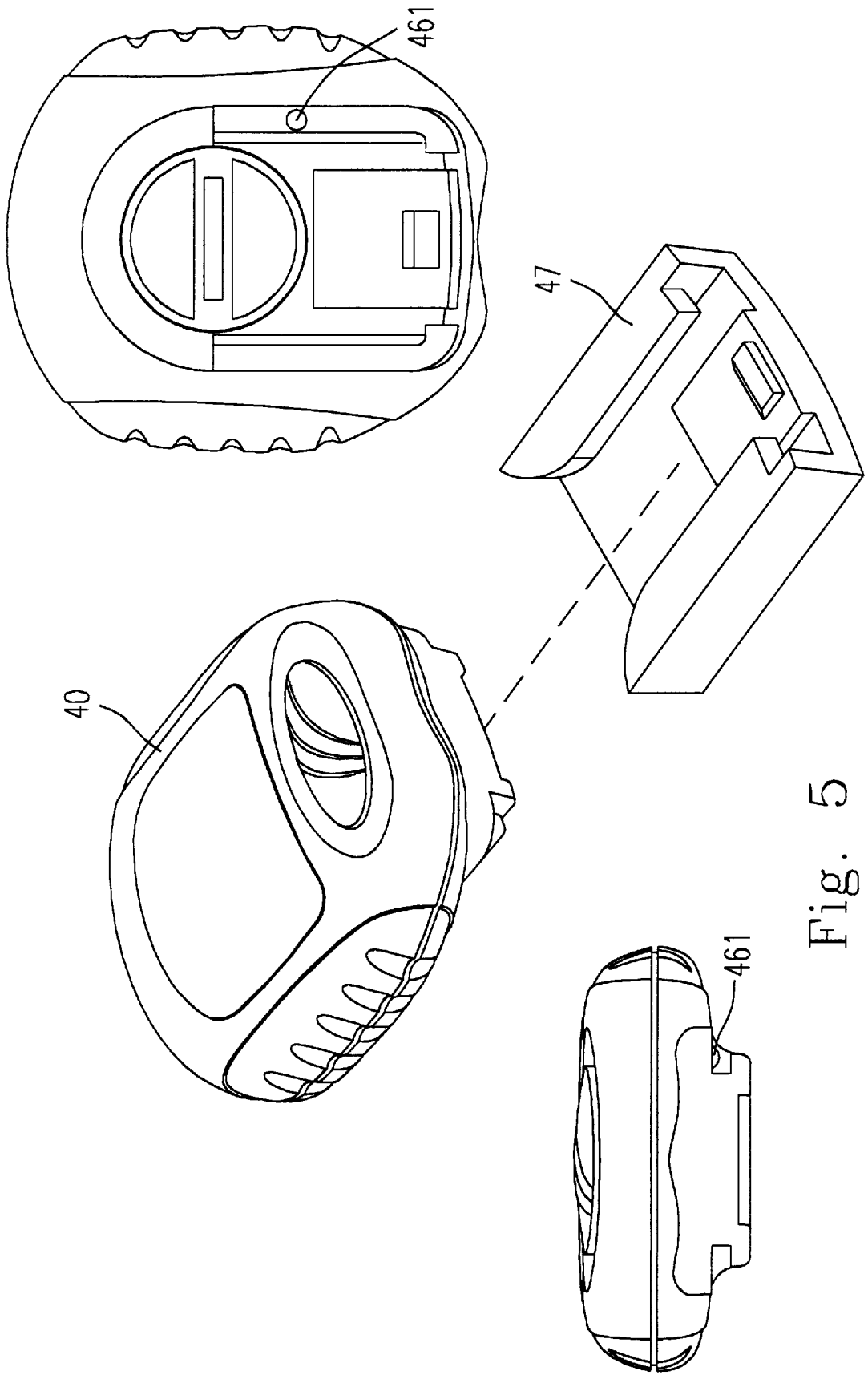
FIG. 5 is a schematic diagram showing the switch having a resilient member of the trip meter of the present invention.

Referring to FIG. 5, the switch in the main body 40 has a resilient member 461 protruded from the main body 40 of the trip meter. The resilient member is made of plastic. When the main body is detached from the bracket 47, the resilient member 461 is protruded from the main body 40 and the switch (not shown in FIG. 5) is turned off. When the main body 40 is secured to the bracket 47, the resilient member 461 is pressed into the main body 40 and the switch is turned on. Therefore, the switch can be turned on/off due to an urging force of the resilient member 461 in response to the connection/disconnection of the main body 40 and the bracket 47. The main body 40 of the trip meter can be detached from the bracket 47 of the bicycle when the bicycle is not used and the signal processing circuit is not in action at that time. The trip data will not be changed when the main body 40 is disconnected from the bracket 47. Because the signal receiving circuit and the signal processing circuit are built in the same main body, no water-resistant contacting point for connecting different circuits is needed. The process for manufacturing the trip meter according to the present invention is simple.

Figure 6:
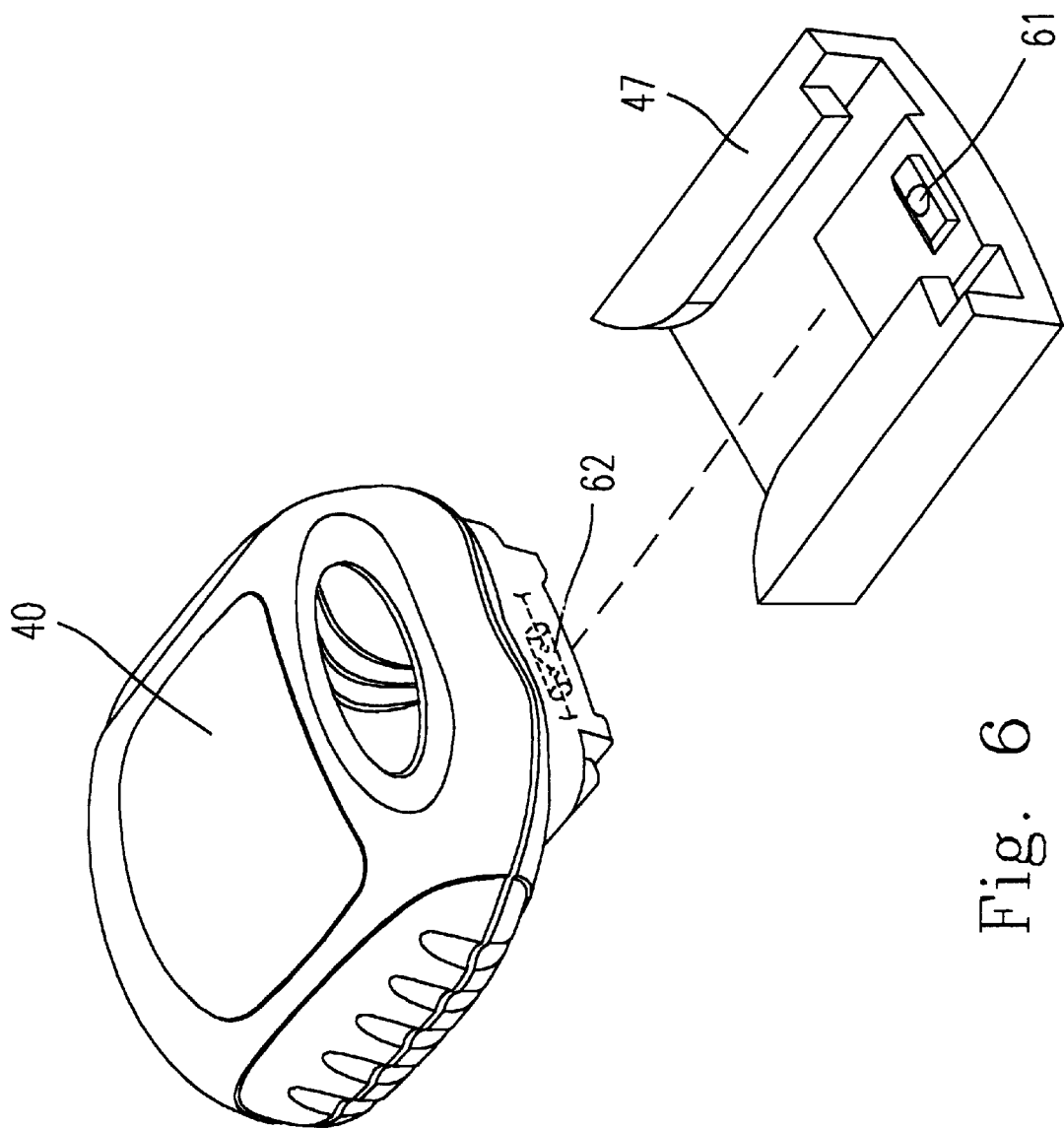
FIG. 6 is a schematic diagram showing the magnetic switch of the trip meter of the present invention.

Certainly, the switching circuit of the trip meter shown in FIGS. 4(a)–(d) can be replaced by a magnetic switch. Referring to FIG. 6, the magnetic switch includes a magnetic bar 61 arranged in the bracket 47 and a reed switch 62 arranged in the main body 40. The switch can be turned on/off due to a magnetic force of the magnetic bar 61 in response to the connection/disconnection of the main body 40 and the bracket 47. When the main body 40 is detached from the bracket 47, the reed switch 62 is turned off. When the main body 40 is secured to the bracket 47, the reed switch 62 is turned on due to the magnetic force of the magnetic bar 61. Therefore, all circuits are at work and the trip data are shown on the LCD display. The main body 40 of the trip meter can be detached from the bracket 47 of the bicycle when the bicycle is not used and the signal processing circuit is not in action at that time. The cost of the magnetic switch is higher than that of the switch having a resilient member, but the magnetic switch has a better water-resistibility.

According to the above description of the switch, the switch is turned on when the main body is secured to the bracket. Certainly, the design of the switch can be changed, that is, the switch can be turned on when the main body is detached from the bracket and turned off when the main body is secured to the bracket. The operation of all circuits will be initiated when the switch is turned off. The design of the switch is easy for a person of ordinary skill in the art, so the detailed description of the switch are omitted herein.

In conclusion, the trip meter of the present invention further includes a detector positioned in the main body of the trip meter for detecting a connective state of the main body and the bracket on the bicycle. When the main body is connected with the bracket, the signal receiving circuit can receive the pulse signal of the transmitter, and the signal processing circuit can generate an output signal indicative of the trip data. Then, the trip data can be shown on the LCD display. On the contrary, when the main body is disconnected from the bracket, the signal receiving circuit may not be able to wirelessly receive the pulse signal of the transmitter or the signal processing circuit may not receive the pulse signal from the signal receiving circuit. Therefore, the signal processing circuit will not be interfered by other electromagnetic signals when the main body of the trip meter is detached from the bracket on the bicycle.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A trip meter adapted to be used in a bicycle for displaying a plurality of trip data of said bicycle, wherein said bicycle has a signal transmitter for outputting a pulse signal each time said bicycle travels over a specific distance, comprising:

a bracket secured to a member of said bicycle;

a main body detachably secured to said bracket;

a signal receiving circuit positioned in said main body for wirelessly receiving said pulse signal outputted from said transmitter;

a signal processing circuit electrically connected to said signal receiving circuit for counting a number and a frequency of said pulse signal and correspondingly generating an output signal indicative of said plurality of trip data;

a display circuit electrically connected to said signal processing circuit for displaying said output signal generated from said signal processing circuit;

a battery built in said main body for supplying a power to said signal receiving circuit, said signal processing circuit, and said display circuit; and a detector positioned in said main body for detecting a connective state of said main body and said bracket so that said signal receiving circuit is unable to wirelessly receive said pulse signal of said transmitter when said main body of said trip meter is detached from said bracket on said bicycle.

2. The trip meter according to claim 1 wherein said detector includes a switching circuit for controlling a power supply of said battery.

3. The trip meter according to claim 2 wherein said switching circuit is a switch having a resilient member for being turned on/off due to an elastic force of said resilient member in response to said connective state of said main body and said bracket.

4. The trip meter according to claim 2 wherein said switching circuit includes:

a magnetic bar arranged in said bracket; and a reed switch arranged in said main body for being turned on/off due to a magnetic force of said magnetic bar in response to said connective state of said main body and said bracket.

5. The trip meter according to claim 2 wherein said switching circuit is mounted between said battery and said signal receiving circuit.

6. The trip meter according to claim 5 wherein said switching circuit is turned on and said power of said battery is supplied to said signal receiving circuit for allowing said signal receiving circuit to wirelessly receive said pulse signal transmitted from said transmitter when said main body of said trip meter is secured to said bracket on said bicycle.

7. The trip meter according to claim 6 wherein said switching circuit is turned off and said power supplied from said battery to said signal receiving circuit is interrupted so that said signal receiving circuit is unable to receive said pulse signal of said transmitter when said main body of said trip meter is detached from said bracket on said bicycle.

8. The trip meter according to claim 2 wherein said switching circuit is mounted between said battery and said signal processing circuit.

9. The trip meter according to claim 8 wherein said switching circuit is turned on and said power of said battery is supplied to said signal receiving circuit through said signal processing circuit for allowing said signal receiving circuit to wirelessly receive said pulse signal transmitted from said transmitter when said main body of said trip meter is secured to said bracket on said bicycle.

10. The trip meter according to claim 9 wherein said switching circuit is turned off and said power supplied by said battery is interrupted so that said signal receiving circuit is unable to wirelessly receive said pulse signal of said transmitter when said main body of said trip meter is detached from said bracket on said bicycle.

11. The trip meter according to claim 1 wherein said signal receiving circuit and said signal processing circuit are incorporated into an integrated circuit.

12. The trip meter according to claim 1 wherein said display circuit includes a liquid-crystal display (LCD).

13. The trip meter according to claim 1 wherein said plurality of trip data comprise a speed and a traveling distance of said bicycle.

14. A trip meter adapted to be used in a bicycle for displaying a plurality of trip data of said bicycle, wherein said bicycle has a signal transmitter for outputting a pulse signal each time said bicycle travels over a specific distance, comprising:

a bracket secured to a member of said bicycle;

a main body detachably secured to said bracket;

a signal receiving circuit positioned in said main body for wirelessly receiving said pulse signal outputted from said transmitter;

a signal processing circuit electrically connected to said signal receiving circuit for counting a number and a frequency of said pulse signal and correspondingly generating an output signal indicative of said plurality of trip data;

a display circuit electrically connected to said signal processing circuit for displaying said output signal generated from said signal processing circuit;

a battery built in said main body for supplying a power to said signal receiving circuit, said signal processing circuit, and said display circuit; and a detector positioned in said main body for detecting a connective state of said main body and said bracket so that said signal processing circuit is unable to receive said pulse signal from said signal receiving circuit when said main body of said trip meter is detached from said bracket on said bicycle.

15. The trip meter according to claim 14 wherein said detector includes a switching circuit mounted between said battery and said signal processing circuit for causing said power of said battery to be supplied to said signal processing circuit.

16. The trip meter according to claim 15 wherein said switching circuit is a switch having a resilient member protruded from said main body, for being turned on/off due to an elastic force of said resilient member in response to said connective state of said main body and said bracket.

17. The trip meter according to claim 15 wherein said switching circuit includes:

a magnetic bar arranged in said bracket; and a reed switch arranged in said main body for being turned on/off due to a magnetic force of said magnetic bar in response to said connective state of said main body and said bracket.

18. The trip meter according to claim 15 wherein said switching circuit is turned on and said power of said battery is supplied to said signal processing circuit so that said signal processing circuit receives said pulse signal of said transmitter and generates said output signal indicative of said travel data when said main body of said trip meter is secured to said bracket on said bicycle.

19. The trip meter according to claim 18 wherein said switching circuit is turned off for interrupting said power to be supplied to said signal processing circuit and causing a loop between said signal processing circuit and said signal receiving circuit to be disconnected so that said signal processing circuit is unable to receive said pulse signal from said signal receiving circuit when said main body of said trip meter is detached from said bracket on said bicycle.

20. The trip meter according to claim 19 wherein said signal receiving circuit and said signal processing circuit are incorporated into an integrated circuit.

21. The trip meter according to claim 14 wherein said display circuit includes a liquid-crystal display (LCD).

22. The trip meter according to claim 14 wherein said plurality of trip data comprise a speed and a traveling distance of said bicycle.

* * * * *